United States Patent [19]

Crowell

[11] Patent Number: 5,631,509

[45] Date of Patent: May 20, 1997

[54] MOTOR HAVING THERMOSTATICALLY CONTROLLED OR LIMITED SPACE HEATER

[75] Inventor: James R. Crowell, Huntertown, Ind.

[73] Assignee: General Electric Company, Fort Wayne, Ind.

[21] Appl. No.: 281,336

[22] Filed: Jul. 27, 1994

[51] Int. Cl.[6] .................................................. H02K 11/00
[52] U.S. Cl. ............................................................ 310/68 C
[58] Field of Search ............................... 310/68 C, 68 A; 165/26; 219/200, 201, 494

[56] References Cited

U.S. PATENT DOCUMENTS

| | | |
|---|---|---|
| 1,029,230 | 6/1912 | Russell . |
| 2,024,385 | 12/1935 | Persons ........................... 236/1 |
| 3,878,362 | 4/1975 | Stinger ........................... 219/528 |
| 4,661,734 | 4/1987 | Capuano et al. ........................... 310/89 |
| 4,797,536 | 1/1989 | Handley ........................... 219/494 |
| 5,061,835 | 10/1991 | Iguchi ........................... 219/10.79 |
| 5,103,078 | 4/1992 | Boykin et al. ........................... 219/494 |
| 5,131,455 | 7/1992 | Tsuchiyama et al. ........................... 165/29 |
| 5,161,606 | 11/1992 | Berkeley et al. ........................... 165/1 |
| 5,413,164 | 5/1995 | Teshima et al. ........................... 165/11.1 |

Primary Examiner—Thomas M. Dougherty
Assistant Examiner—Jonathan Link
Attorney, Agent, or Firm—Ralph E. Krisher, Jr.

[57] ABSTRACT

An apparatus adapted to be connected to a power source, the apparatus for driving a rotatable component. A motor has a stationary assembly and a rotatable assembly in magnetic coupling relation to the stationary assembly, the rotatable assembly in driving relation to the rotatable component, the stationary assembly including windings adapted to be energized by the power source to produce an electromagnetic field for rotating the rotatable assembly, the windings having a maximum desired operating temperature and a predetermined minimum desired temperature rise. A heater is in heat exchange relationship to an outer surface of the windings, the heater adapted to be connected to the power source at least when the motor windings are not energized to generate heat transferred to the windings to increase the temperature of the windings. An optional thermostat may be connected in series between the heater and the power source. The thermostat limits a maximum temperature of the heater so that the generated heat is generally insufficient to cause overheating of the heater and the heat generated inhibits condensation on the windings during periods when the motor windings are not energized. The heater has a surface area and a power density such that the heat generated by the heater generally does not raise the temperature of the heater above a maximum temperature during periods when the motor windings are not energized and substantially all residual heat has dissipated from the motor. Methods of manufacture of such motors are also disclosed.

21 Claims, 3 Drawing Sheets

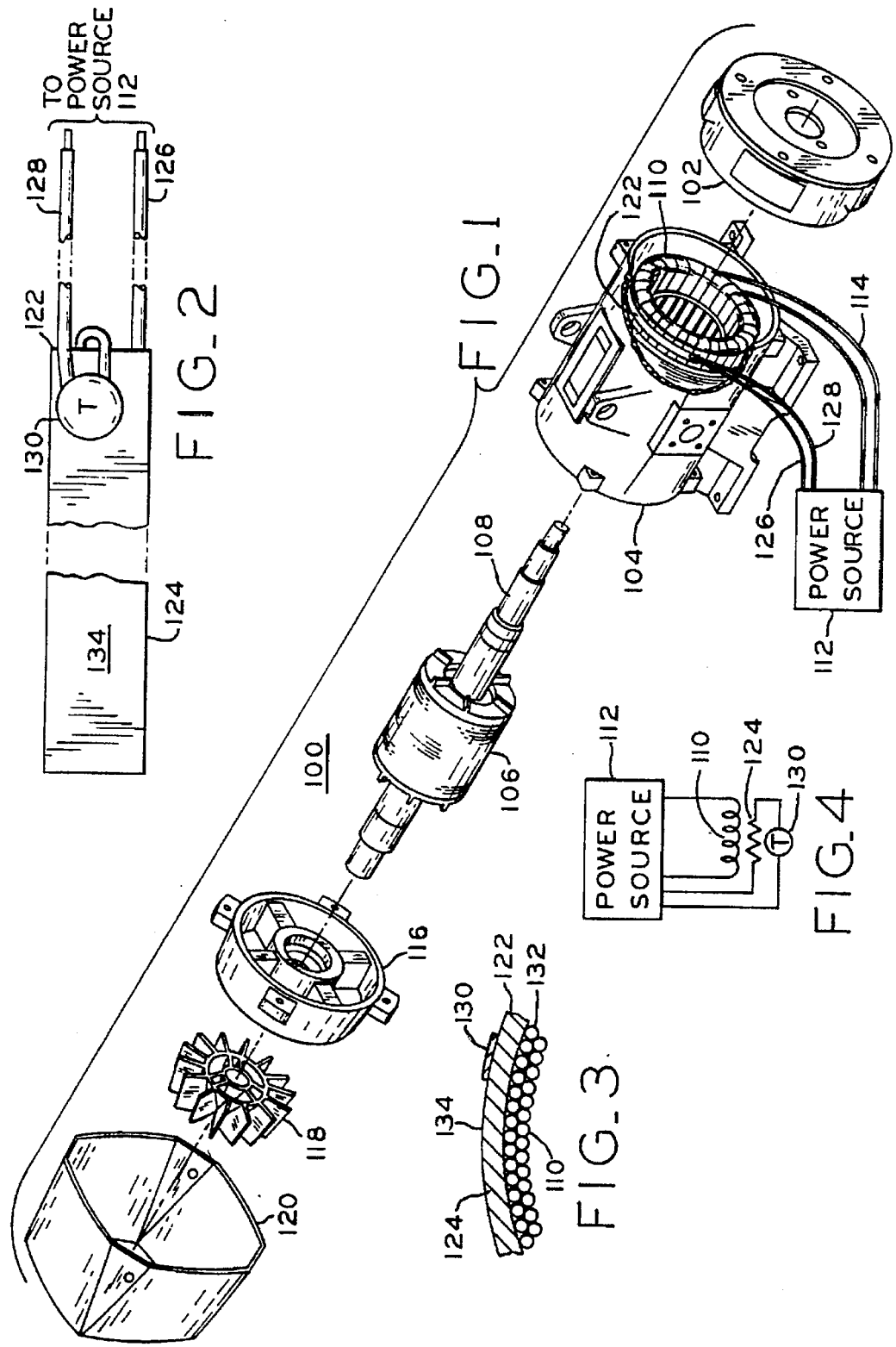

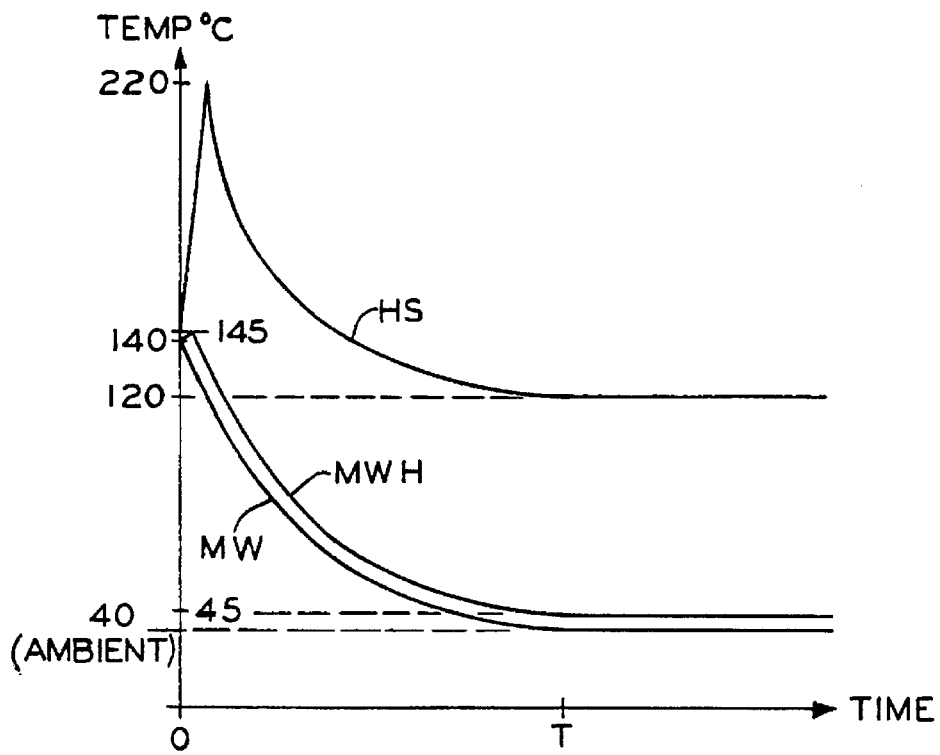
FIG_5
PRIOR ART
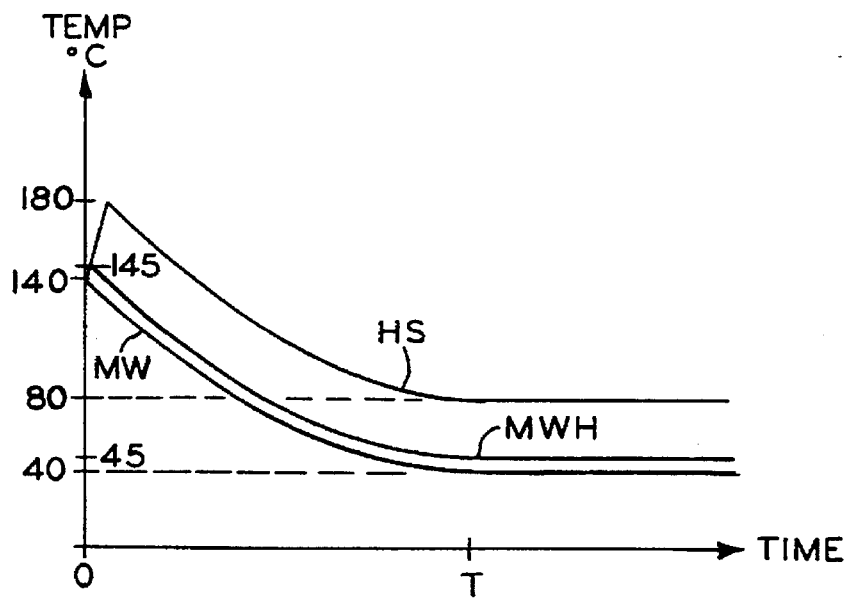
FIG_6

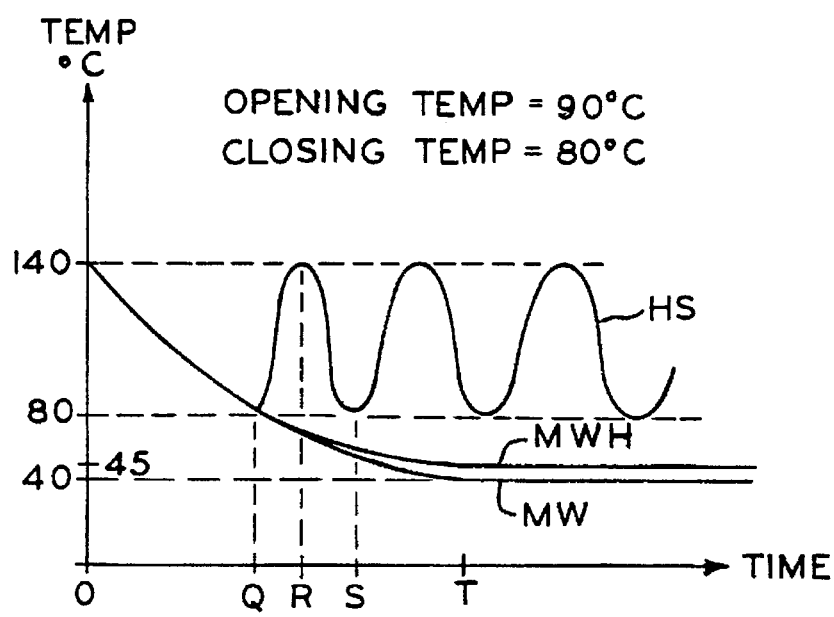
FIG_7
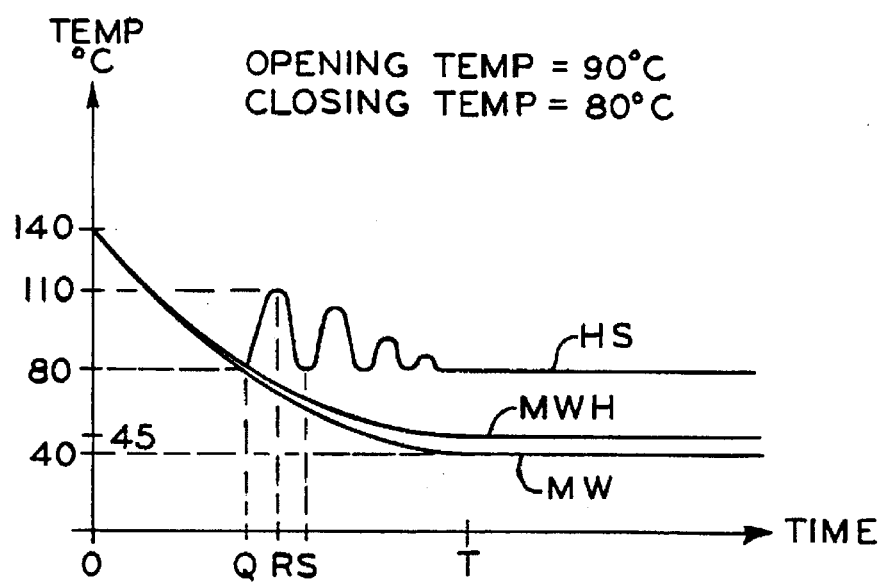
FIG_8

MOTOR HAVING THERMOSTATICALLY CONTROLLED OR LIMITED SPACE HEATER

BACKGROUND OF THE INVENTION

This invention relates generally to motors have heaters which are used to prevent condensation on the motor windings when the motor is not running and, in particular, to a motor having a thermostatically controlled space heater.

It has been recognized that condensation tends to develop on a motor winding after the motor has increased in temperature during an operating cycle and the motor cools after the operating cycle. In the prior art, this problem has been partially addressed by space heaters used to maintain the temperature of the motor winding above ambient temperature when the motor is not running. In particular, the prior art has mounted space heaters adjacent to the motor windings to generate heat which is transferred to the motor windings. Such space heaters are operated when the motor is not running. Due to the high surface temperatures developed by such space heaters, a thermally-insulated layer is positioned between the space heater and the motor winding. Although this tends to inhibit heat transfer to some extent, it prevents direct contact of the space heater with the motor winding. Because of the high surface temperature of the space heater, direct contact between the space heater and the motor winding could damage the motor winding by melting winding insulation or causing other thermal deterioration of the winding.

For some motor applications in hazardous environments, maximum surface temperatures must be limited in order to prevent or minimize the possibility of auto-ignition of gases, vapors or dust that may be present. In such environments, prior art motors with space heaters may not be used or useful because of the high surface temperatures developed by the space heaters.

Therefore, there is a need for a motor having a space heater with low maximum surface temperatures which would prevent thermal damage to the motor windings and which could be used in hazardous locations. There is also need for such motors which are efficient and reduce the power requirements to power the space heater when the motor is not running.

SUMMARY OF THE INVENTION

It is an object of this invention to provide a motor having a thermostatically controlled or limited space heater which has a maximum surface temperature limit allowing it to be employed in hazardous environments while minimizing or preventing the possibility of autoignition of gases, vapors or dust that may be present in such hazardous environments.

It is another object of this invention to provide a motor having a thermostatically controlled or limited space heater which limits a maximum temperature of the heater so that the generated heat is generally insufficient to cause overheating of the heater and the heat generated inhibits condensation on the windings during periods when the motor windings are not energized and the motor is not operating.

It is another object of this invention to provide a motor having a thermostatically controlled or limited space heater which inhibits overheating of both the heater and the motor windings.

It is yet another object of this invention to provide a motor having a thermostatically controlled or limited space heater wherein the thermostat prevents energization of the heater when the motor temperature is at or near a maximum desired operating temperature of the motor so that overheating of the motor and heater are prevented.

It is another object of this invention to provide a motor having a thermostatically controlled or limited space heater in which no thermal insulation is needed between the heater and the windings thereby enhancing heat transfer between the heater and the motor windings.

It is yet another object of this invention to provide a thermostatically controlled or limited space heater for a motor which generates heat which does not raise the thermostat temperature above an open-circuit temperature of the thermostat during periods when the motor windings are not energized and substantially all residual heat has dissipated from the motor thereby minimizing cycling of the thermostat during such periods.

It is another object of this invention to provide a thermostatically controlled or limited space heater which is substantially continuously energized during periods when the motor windings are not energized and substantially all residual heat has dissipated from the motor to substantially maintain the temperature of the windings above a sum of the predetermined minimum desired temperature rise plus an ambient temperature.

An apparatus according to the invention is adapted to be connected to a power source and drive a rotatable component. A motor has a stationary assembly and a rotatable assembly in magnetic coupling relation to the stationary assembly. The rotatable assembly is in driving relation to the rotatable component. The stationary assembly includes windings adapted to be energized by the power source to produce an electromagnetic field for rotating the rotatable assembly, the windings having a maximum desired operating temperature and a predetermined minimum desired temperature rise. A heater in heat exchange relationship to an outer surface of the winding is adapted to be connected to the power source at least when the motor windings are not energized to generate heat transferred to the windings to increase the temperature of the windings. A thermostat connected in series between the heater and the power source has an opening temperature and a closing temperature such that when the temperature of the thermostat is below the closing temperature, the thermostat is adapted to provide a closed circuit between the heater and the power source to energize the heater and such that when the temperature of the thermostat is above the temperature, the thermostat is adapted to provide an open circuit between the heater and the power source to inhibit energizing the heater.

In one embodiment of the invention, the opening temperature of the thermostat is less than the maximum desired operating temperature of the motor windings so that the thermostat presents an open circuit and the heater does not generate heat immediately after energization of the motor windings is discontinued when the motor has reached the maximum desired operating temperature. In another embodiment of the invention, the closing temperature of the thermostat is greater than an ambient temperature of the motor so that the thermostat presents a closed circuit and the heater generates heat when the thermostat temperature is below the closing temperature whereby the thermostat limits a maximum temperature of the heater so that the generated heat is generally insufficient to cause overheating of the heater and the heat generated inhibits condensation on the windings during periods when the motor windings are not energized.

In one embodiment of the invention, the opening temperature is such that the thermostat provides a closed circuit resulting in the heater being substantially continuously energized during periods when the motor windings are not energized and substantially all residual heat has dissipated from the motor to substantially maintain the temperature of the windings above a sum of the predetermined minimum desired temperature rise plus an ambient temperature. In another embodiment of the invention, the closing temperature of the thermostat is greater than the ambient temperature of the motor so that the thermostat presents a closed circuit and the heater generates heat when the thermostat temperature is below the closing temperature whereby the heater generates heat which inhibits condensation on the windings during periods when the motor windings are not energized.

In one embodiment of the invention, the heater has a surface area and a power density such that the heat generated by the heater generally does not raise the temperature of the heater above the maximum temperature during periods when the motor windings are not energized whereby no thermal insulation is located between the heater and the windings thereby enhancing heat transfer therebetween such that the heat generated by the heater does not cause the temperature of the motor or heater to exceed the maximum temperature and the heat generated by the heater inhibits condensation on the windings during periods when the motor windings are not energized.

The invention also includes a method of manufacturing a motor comprising the steps of:

providing a motor having a stationary assembly and a rotatable assembly in magnetic coupling relation to the stationary assembly, the rotatable assembly in driving relation to a rotatable component, the stationary assembly including windings adapted to be energized by a power source to produce an electromagnetic field for rotating the rotatable assembly, the windings having a maximum desired operating temperature and a predetermined minimum desired temperature rise;

mounting a heater in heat exchange relationship to an outer surface of the windings, the heater adapted to be connected to the power source at least when the motor windings are not energized to generate heat transferred to the windings to increase the temperature of the windings;

connecting a thermostat in series between the heater and a power source, the thermostat having an opening temperature such that when the temperature of the thermostat is below the opening temperature, the thermostat is adapted to provide a closed circuit between the heater and the power source to energize the heater and such that when the temperature of the thermostat is above the opening temperature, the thermostat is adapted to provide an open circuit between the heater and the power source to inhibit energizing the heater;

selecting the opening temperature such that the opening temperature of the thermostat is less than the maximum desired operating temperature of the motor windings so that the thermostat presents an open circuit and the heater does not generate heat immediately after energization of the motor windings is discontinued when the motor has reached the maximum desired operating temperature; and selecting the closing temperature such that the closing temperature of the thermostat is greater than an ambient temperature of the motor so that the thermostat presents a closed circuit and the heater generates heat when the thermostat temperature is below the closing temperature whereby the thermostat limits a maximum temperature of the heater so that the generated heat is generally insufficient to cause overheating of the heater and the heat generated inhibits condensation on the windings during periods when the motor windings are not energized.

The invention also includes a method of manufacturing a motor comprising the steps of:

providing a motor having a stationary assembly and a rotatable assembly in magnetic coupling relation to the stationary assembly, the rotatable assembly in driving relation to a rotatable component, the stationary assembly including windings adapted to be energized by a power source to produce an electromagnetic field for rotating the rotatable assembly, the windings having a predetermined minimum desired temperature rise;

mounting a heater in heat exchange relationship to an outer surface of the windings, the heater adapted to be connected to the power source at least when the motor windings are not energized to generate heat transferred to the windings to increase the temperature of the windings;

connecting a thermostat in series between the heater and a power source, the thermostat having an opening temperature and a closing temperature such that when the temperature of the thermostat is below the closing temperature, the thermostat is adapted to provide a closed circuit between the heater and the power source to energize the heater and such that when the temperature of the thermostat is above the opening temperature, the thermostat is adapted to provide an open circuit between the heater and the power source to inhibit energizing the heater; and selecting the closing temperature such that the thermostat provides a closed circuit resulting in the heater being substantially continuously energized during periods when the motor windings are not energized and substantially all residual heat has dissipated from the motor to substantially maintain the temperature of the windings above a sum of the predetermined minimum desired temperature rise plus an ambient temperature whereby the heater generates heat which inhibits condensation on the windings during periods when the motor windings are not energized.

Other objects and features will be in part apparent and in part pointed out hereinafter.

BRIEF DESCRIPTION OF THE DRAWINGS

FIG. 1 is an exploded, perspective view of a motor of the invention including a strip heater on windings of the motor.

FIG. 2 is a partial plan view of a strip heater of the invention which is mounted on the windings of the motor, the strip heater having a thermostat on its surface.

FIG. 3 is a partial cross sectional view of a strip heater of the invention directly on the end turns of the windings of a motor.

FIG. 4 is a diagrammatic illustration of a motor of the invention including the motor and heater.

FIGS. 5, 6, 7 and 8 are graphs illustrating operation of: a motor of the prior art (FIG. 5); a motor of the invention having a heater of low watt density, increased surface area and no thermostat (FIG. 6); a motor of the invention having a thermostat (FIG. 7); and a motor of the invention having both a thermostat and a heater of low watt density and increased surface area (FIG. 8). In each graph, time is along the X-axis and temperature is along the Y-axis. These graphs are not to scale.

Corresponding reference characters indicate corresponding parts throughout the drawings.

DETAILED DESCRIPTION OF PREFERRED EMBODIMENTS

Referring to FIG. 1, an exploded, perspective view of a motor 100 of the invention is illustrated. Although this motor 100 is illustrated as an industrial motor, it is contemplated that any motor having windings which must be heated is included in the invention. Motor 100 includes an end shield 102 which engages one end of frame and stator assembly 104. Assembly 104 constitutes a stationary assembly for receiving a rotatable assembly 106 in magnetic coupling relation to the assembly 104. The rotatable assembly 106 includes a shaft 108 which is in driving relation to a rotatable component (not shown). The frame and stator assembly 104 includes windings 110 adapted to be energized by a power source 112 via lines 114 to produce an electromagnetic field for rotating the rotatable assembly 106. A second end shield 116 engages the other end of the assembly 104. End shields 102 and 116 include bearings or other retainers known in the art for supporting the rotatable assembly 106 within the frame and stator assembly 104. Optionally, the motor 100 may include an external fan 118 engaging the shaft 108 for moving air about the motor and assisting in its cooling. Also optional is a fan cover 120.

The motor windings 110 tend to heat up during operation of the motor because of the current flowing through the windings 110 as provided by the power source 112 via lines 114. When the motor is not operating, the residual heat which has built up in the motor slowly dissipates until the motor reaches a temperature equal to the ambient temperature of the air or structure around the motor. In general, the residual heat is heat which has been added to the motor as a result of its operation. During dissipation of such residual heat and cooling of the motor, condensation can develop on the motor windings which is undesirable. The condensation can deteriorate the motor components, causing rusting or short-circuiting of the motor and its components. As a result, each motor winding 110 has a predetermined minimum desired temperature above the ambient temperature. As long as the motor windings 110 are maintained at or above the predetermined minimum desired temperature, the collection of condensation on the windings is inhibited or prevented. The difference between the predetermined minimum desired temperature and the ambient temperature is referred to as a predetermined minimum desired temperature rise.

A heater 122 in heat exchange relationship to an outer surface of the windings 110 is positioned on the windings. The heater 122 is adapted to be connected to the power source 112 at least during periods when the motor windings 110 are not energized. The heater 122 generates heat transferred to the windings to increase the temperature of the windings 110 to avoid condensation when the motor 100 cools.

The heater 122, which is illustrated in more detail in FIG. 2, is preferably a flexible strip heater having a resistive element body 124 through which current flows and is converted into heat. The body 124 is connected to terminals 126 and 128 for supplying electrical current to the body 124. Preferably, an optional thermostat 130 is mounted on the surface of the body 124 of heater 122 and is connected in series between the body 124 and terminal 128. The thermostat has an opening temperature and a closing temperature causing the thermostat to operate in the following manner. When the temperature of the thermostat 130 is below the closing temperature, the thermostat is adapted to provide a closed circuit between the heater and the power source to energize the heater 122 (see FIG. 4). When the temperature of the thermostat 130 is above the opening temperature, the thermostat is adapted to provide an open circuit between the heater 122 and the power source 112 to inhibit energizing of the heater 122.

Depending on the motor configuration, its location, application, and environment, the motor has a maximum desired operating temperature which should not be exceeded. In some environments, this maximum desired operating temperature may equal the steady state operating temperature of the motor. In order to prevent overheating of the motor 100 and/or the heater 122, the opening temperature of the thermostat 130 is less than the maximum desired operating temperature. For example, the thermostat presents an open circuit and the heater does not generate heat immediately after energization of the motor windings is discontinued when the motor has reached a steady state operating temperature. In addition, the closing temperature of the thermostat 130 is greater than the ambient temperature of the motor 100 so that the thermostat 130 presents a closed circuit and the heater 122 generates heat when the thermostat temperature is below the closing temperature. As a result, thermostat 130 limits a maximum temperature of the heater 122, motor windings 110, and motor 104 so that the heat generated by the heater 122 is generally insufficient to cause overheating of the heater, motor or motor windings. At the same time, the heat generated by the heater 122 inhibits condensation on the windings during periods when the motor windings are not energized.

As illustrated in more detail in FIG. 3, it is contemplated that the windings 110 may include end turns 132 and it is further contemplated that the heater 124 be in direct contact with the end turns 132 of the windings 110. In other words, the body 124 of the heater 122 is adhered directly to the outer layer of windings to enhance heat transfer between the heater 122 and the motor windings 110. It is also contemplated that no thermal insulation would be positioned between the heater 122 and the windings 110, other than the electrical insulative coating on the wires of windings 110.

Furthermore, it is contemplated that the thermostat 130 be located on a surface 134 of the body 124 of the heater 122. This location allows the thermostat to accurately monitor the temperature of the heater thereby preventing overheating of the heater. The closing temperature of the thermostat 130 is preferably at or above the sum of the predetermined minimum desired temperature rise of the motor windings 110 plus the ambient temperature. The closing temperature allows maintaining a winding temperature rise above ambient to prevent condensation. The opening temperature of the thermostat 130 is preferably at or below the maximum desired operating temperature. In this way, the open circuit caused by the thermostat when its temperature equals the opening temperature inhibits overheating of the heater and the motor windings. In one preferred embodiment of the invention, the predetermined minimum desired temperature rise is equal to a temperature rise of the windings caused by continuous operation of the heater in a steady state condition after substantially all residual heat has been dissipated from the motor.

There are four factors that determine the effectiveness of the thermostatically controlled or limited space heater according to the invention. The first factor in determining effectiveness is that the thermostat must be properly located and selected to have the appropriate opening and closing temperatures. As noted above, the thermostat 130 is preferably mounted on the surface 134 of the heater 122 and connected in series between the heater 122 and the power source 112. The opening temperature of the thermostat 130 is selected in order to limit the maximum surface temperature of the heater surface 134. Depending on the type of thermostat mounting, temperature variations over the heater surface, and the heat transfer variation, the opening temperature of the thermostat 130 may differ from the maximum desired temperature. Preferably, a hermetically sealed thermostat may be used to comply with standards that require devices to be arcless and sparkless.

The second factor in determining effectiveness is the surface area of the heater 122. Preferably, the heater has a large surface area between 15–225% greater than the standard surface area. This large surface area generates the power needed to efficiently heat the windings 110 and distribute heat throughout the windings sufficient to prevent condensation.

The third factor in determining effectiveness is the power density of the heater 122. Preferably, the heater 122 has a low power density of 1.0 watts/in$^2$ or less, which minimizes the temperature variations occurring over the heater surface. The low power density also reduces surface temperatures and allows the heater 122 to be directly mounted on the motor winding end turns 132 (see FIG. 3), which improves the rate of heat transfer from the heater 122 to the windings 110.

The following Tables 1 and 2 illustrate a comparison of various sized heaters having standard surface area and power density of the prior art as contrasted with the large surface area and low power density of the invention:

TABLE 1

Comparison of Surface Area of Prior Art Heaters and Heaters of the Invention

| HORSE-POWER | FRAME SIZE | STANDARD SURFACE AREA OF PRIOR ART (in$^2$) | LARGE SURFACE AREA OF INVENTION (in$^2$) |
| --- | --- | --- | --- |
| 1–5 | 180 | 9.0 | 13.5 |
| 2–30 | 210–280 | 30.0 | 35.0 |
| 25–125 | 320–400 | 49.0 | 72.4 |
| 100–350 | 440 | 70.0 | 152.8 |
| 200–1500 | 500 | 94.5 | 213.4 |

Tables 1 and 2 are based on known non-optimized operation of existing motors and heaters. In general, the surface area of the invention is about twice the standard surface area and the power of the invention is about half the standard power so that the power density of the invention is about 25% of the standard power density (power density=power/surface area). This is, in part, based on known non-optimized prior art. The actual surface area and power are functions of thermal attachment of heater to windings, motor dissipation rate and stator/motor dimensions (which also affects dissipation rate).

A fourth factor which determines effectiveness of the heater 122 is the operating duty cycle during normal operation. The combination of the thermostat 130 with its opening and closing temperatures, larger surface area, and lower power density allows the space heaters of the invention to operate continuously under normal conditions. Continuous operation allows the space heater 122 to provide a constant temperature rise in the motor winding which will prevent condensation. In this situation, one function of the thermostat is to limit excess temperature. Proper selection of the opening and closing temperatures, surface area, and power density will minimize thermostat cycling which will provide longer life for the thermostat. Continuous operation means that the thermostat is not cycling and switching from on and off conditions. In systems which do not employ a thermostat, the first factor does not apply and the remaining factors become more significant.

Referring to FIGS. 5–8, graphs are presented illustrating operation of various motors. FIG. 5 illustrates the operation of a motor of the prior art with time along the X-axis and temperature of the motor or motor windings along the Y-axis. The graph of FIG. 5 assumes that the prior art motor has a space heater which is constantly energized during periods of motor shutdown. At time zero, it is assumed that the motor is shut down after reaching a steady state operating temperature of 140° C. According to FIG. 5, this prior art motor has a winding temperature rise due to operation of 100° C. since it is assumed that the ambient temperature is 40° C. The graph also assumes a heater temperature rise of 80° C. At time zero, the motor is shut down and the heater is immediately energized which causes the temperature of the heater surface to rise from 140° C. to 220° C., as illustrated by line HS (heater surface). This causes the motor windings to increase in temperature from 140° C. to 145° C., as indicated by line MWH (motor winding with heater). As the motor cools and residual heat of the motor dissipates, the motor reaches a steady state static condition at time T. At that time, the motor winding temperature is approximately

TABLE 2

Comparison of Power and Power Density of Prior Art Heaters and Heaters of the Invention

| HORSE-POWER | FRAME SIZE | STANDARD POWER OF PRIOR ART (watts) | LOW POWER OF INVENTION (watts) | STANDARD POWER DENSITY OF PRIOR ART (watts/in$^2$) | LOW POWER DENSITY OF INVENTION (watts/in$^2$) |
| --- | --- | --- | --- | --- | --- |
| 1–5 | 180 | 45 | 13 | 5.0 | 1.0 |
| 2–30 | 210–280 | 60 | 35 | 2.0 | 1.0 |
| 25–125 | 320–400 | 100 | 70 | 2.0 | 1.0 |
| 100–350 | 440 | 145 | 125 | 2.1 | 0.8 |
| 200–1500 | 500 | 350 | 200 | 3.7 | 0.9 |

45° C. as indicated by line MWH and the heater surface temperature is approximately 120° C. as indicated by line HS. Line MW (motor winding without heater) has been added to FIG. 5 to illustrate the temperature of the motor windings if the heater is not operated. At time T and thereafter, it can be seen that a temperature rise of approximately 5° C. of the motor windings results from heater operation to prevent or inhibit condensation. It can also be seen that at time T and thereafter there is a temperature difference of approximately 75° C. between the temperature of the motor windings and the temperature of the heater surface. This is due in part to thermal insulation between the heater and the windings and temperature variations on the heater. This large differential between the temperature of the motor windings and the temperature of the heater surface is undesirable, particularly in hazardous installations. Also, heaters of the prior art generally have high watt densities which create wide temperature ranges between hot spots and cold spots on the heater.

FIG. 6 illustrates a motor of the invention having a heater with lower watt density than the heater of FIG. 5, with a larger surface area than the heater of FIG. 5 and with no thermostat. The lower watt density means that the heater surface HS peaks at 180° C. rather than 220° C. as illustrated in FIG. 5 providing a heater temperature rise of 40° C. On the other hand, the increased surface area of the heater allows the heater to raise the motor winding temperature by 5° C., the same amount as illustrated in FIG. 5. In this embodiment, some thermal insulation may be required to prevent overheating of the windings immediately after shutdown. If a momentary over-temperature condition of the windings is acceptable, the heater may be installed directly on the winding. Condensation is again prevented by maintaining the winding temperature 5° C. above ambient. The low watt density reduces temperature extremes between the hot and cold spots on the heater. When the heater is mounted directly on the windings, the wattage may be reduced further because of better heat transfer.

Referring again to FIG. 6, it can be seen that the heater is provided with a surface area and a power density such that the heat generated by the heater generally does not raise the temperature of the heater above the maximum temperature of 180° C. (which is lower than the maximum of 220° C. of FIG. 5) during periods when the motor windings are not energized. As illustrated in FIG. 6, it can be seen that the temperature of the heater surface HS after time T is below the steady state motor running temperature of 140° C. This is because the heat generated by the heater does not cause the temperature of the heater or motor windings or the motor to exceed the maximum temperature. At the same time, the heat generated by the heater inhibits condensation on the windings during periods when the motor windings are not energized by causing a 5° temperature rise in the motor windings to prevent condensation.

FIG. 7 illustrates a motor according to the invention including a space heater having a thermostat mounted on the heater. Regarding FIG. 7, it has been assumed that the heater does not have a low watt density or a large surface area. For example, FIG. 7 would illustrate the motor of FIG. 5 including a thermostat on the heater. FIG. 7 assumes that the thermostat has a closing temperature of 80° C. and an opening temperature of 90° C. At time zero, the motor is shut down after operating and reaching the motor maximum or operating temperature of 140° C. At time zero, it is assumed that the heater and the thermostat are at the same temperature as the motor. Therefore, due to the opening and closing temperatures of the thermostat, the thermostat is in an open circuit condition and the heater is not energized. FIG. 7 assumes that the heater, thermostat and motor windings all cool at the same rate and at the same temperature as residual heat is dissipated. At time Q, the heater, thermostat and motor windings reach a temperature of 80° C. which is the closing temperature of the thermostat. Thereafter, the heater is energized because the thermostat presents a closed circuit between the power supply and the heater causing the heater surface temperature HS to rise. At time R the heater surface temperature is approximately 140° C. It is assumed that the heater surface temperature increases more quickly than the temperature of the thermostat because of delay in heat transfer from the heater to the thermostat. FIG. 7 assumes that a time R or slightly before time R, the heater surface has a temperature of 140° C. and the thermostat has a temperature of 90° C. Since this is the opening temperature of the thermostat, the thermostat presents an open circuit to the heater and further energization of the heater is discontinued. After time R, the heater surface begins to slowly cool as indicated by line HS. As this cooling occurs, it is assumed that the thermostat and the heater equalize and become approximately the same temperature. The heater surface and thermostat continue to cool until time S when they reach a temperature of 80° C., which is the closing temperature. At this point, the thermostat cycles again. As a result, the thermostat can be used to limit the maximum heater surface temperature to be less than the motor operating temperature of 140° C. However, temperature variations on the heater between the hot and cold spots can make such control of the maximum temperature difficult. Also, the thermostat will cycle on and off continuously to produce required wattage and limit surface temperature. Over time, this cycling may reduce the life of the thermostat. FIG. 7 assumes that sufficient heat is produced by each cycle of the thermostat to maintain adequate heat generation to prevent condensation. In certain situations, it may be necessarily desirable to increase the opening temperature or decrease the closing temperature to maintain adequate heat generation to prevent condensation. However, the opening temperature cannot be increased to the point that one cycle of the thermostat results in the heater surface temperature exceeding the maximum temperature. The duty cycle of the thermostat of FIG. 7 is illustrated as relatively large for convenience. In fact, the thermostat may cycle frequently (once per minute or more often) in order to limit the temperature and produce sufficient heat to maintain the motor winding temperature above ambient.

FIG. 8 illustrates one preferred embodiment of the invention according to FIGS. 1–4 including a low watt density, large surface area heater with a thermostat mounted thereon. In this illustration, the thermostat is assumed to have a closing temperature of 80° C. and an opening temperature of 90° C. The same basic assumptions regarding the illustration of FIG. 7 have been assumed for FIG. 8. At time zero, the motor is shut down. The motor windings, heater and thermostat are at the same temperature and cool as the residual heat added to the motor due to its operation continues to dissipate over time. At time Q, the temperature of the thermostat, heater and motor winding cools to 80° C. which is the closing temperature thereby causing the thermostat to present a closed circuit between the heater and the power supply. This energizes the heater and causes its surface temperature to increase as indicated by line HS. By assumption, the heater temperature increases more quickly than the thermostat temperature so that the heater temperature has reached the peak of about 110° C. when the thermostat temperature reaches its opening temperature of 90° C. and presents an open circuit to deenergize the heater. This deenergization occurs at time R. Thereafter, the heater and thermostat cool at approximately the same temperature until time S when the thermostat reaches its closing temperature of 80° C. and the cycle repeats itself. One difference between FIGS. 7 and 8 is the magnitude of successive peaks of the cycles of the thermostat. In FIG. 7, the peaks are approximately equal and are designed to occur at or near the maximum temperature of 140° C. In FIG. 8, the lower watt density and larger surface area of the heater means that the heater will heat the motor windings more slowly and evenly so that successive peaks will be reduced as the motor winding temperature continues to decline. Eventually, at time T, the motor windings, heater and thermostat stabilize to the point where the dissipating heat equals the heat generated by the heater thereby maintaining the motor winding temperature MWH at 5° C. above ambient. Between times Q and T the thermostat cycles. After time T, the thermostat remains a closed circuit and does not cycle until the next motor operating cycle.

As illustrated in FIGS. 7 and 8, the thermostat limits the maximum surface temperature of the heater as indicated by line HS so that the generated heat is generally insufficient to cause overheating of the heater. In other words, the surface temperature of the heater never exceeds the maximum desired operating temperature of the motor of 140° C., which may also be the steady state operating temperature of the motor. On the other hand, the thermostat permits sufficient heat generation to inhibit condensation on the windings during periods when the motor windings are not energized. Also, it can be seen that the closing temperature of the thermostat is at or above a sum of the predetermined minimum desired temperature rise of the windings plus the ambient temperature. For FIGS. 7 and 8, the closing temperature of 80° C. is above 45° C. As a result, the opening temperature inhibits overheating of both the heater and the motor windings. It can also be seen that the opening temperature of the thermostat is less than the maximum desired operating temperature of the motor minus a motor temperature rise caused by the heater when continuously energized. As a result, the thermostat presents an open circuit and the heater does not generate heat when the motor or its windings is at or near the maximum desired operating temperature of the motor. Once again, the thermostat thus prevents energization of the heater when the motor temperature is at or near the maximum desired operating temperature so that overheating of the motor and heater are prevented.

As shown in FIG. 8, the minimum predetermined temperature rise is equal to a temperature rise of the windings caused by continuous operation of the heater in a steady state condition after substantially all residual heat has been dissipated from the motor, i.e., after time T. FIG. 8 also illustrates that the heater is continuously energized and the thermostat is in the closed condition during periods when the motor windings are not energized and substantially all residual heat has dissipated from the motor. As shown in FIGS. 1 and 4, the heater 122 may be continuously connected to the power supply 112 via the thermostat 130. However, it is also contemplated that the power source 112 include a shunting circuit which continuously connects the heater 122 to the power supply 112 via the thermostat 130 only during periods when the motor windings 110 are not energized. In other words, either the motor windings 110 or the heater 122 is energized but both are not energized simultaneously. Comparing FIGS. 7 and 8, it can be seen that the motor of FIG. 8 maintains a maximum heater temperature (peaks of HS) which is lower than the maximum heater temperature of FIG. 7. As a result, the motor of FIG. 8 can accommodate hot and cold spots on the heater with reasonable assurance that the heater temperature will not exceed the maximum or steady state operating temperature of the motor. Therefore, the motor of FIG. 8 is particularly suited for hazardous environments.

The invention also includes a method of manufacturing a motor as noted above. In particular, a motor 100 is provided with a heater 122 mounted in heat exchange relationship to the outer surface of the windings 110. The thermostat 130 is connected in series between the heater 122 and the power source 112. The opening temperature of the thermostat 130 is selected to be less than the maximum desired operating temperature of the motor windings so that the thermostat presents an open circuit and the heater does not generate heat immediately after energization of the motor windings is discontinued when the motor has reached the maximum desired operating temperature, i.e., time zero of the graphs. The closing temperature is selected to be greater than the ambient temperature of the motor so that the thermostat presents a closed circuit and the heater generates heat when the thermostat temperature is below the closing temperature, e.g., between time Q and time R. As a result, the thermostat limits the maximum temperature of the heater so that the generated heat is generally insufficient to cause overheating of the heater and the heat generated inhibits condensation on the windings during periods when the motor windings are not energized.

As noted above, the method of manufacture may include mounting the thermostat on the surface of the heater. In addition, the closing temperature of the thermostat may be at or above a sum of the predetermined minimum desired temperature rise of the windings plus the ambient temperature. As a result, the opening temperature inhibits overheating of the heater and the motor windings.

As noted above, the surface area, power density, and closing temperature of the thermostat may be selected so that the heat generated by the heater generally does not raise the thermostat temperature above the opening temperature during periods when the motor windings are not energized and substantially all residual heat has dissipated from the motor thereby minimizing cycling of the thermostat during such periods. This aspect is best illustrated by comparing FIGS. 7 and 8. In FIG. 7, the thermostat will cycle until the motor is energized. Whereas, in FIG. 8, after time T, the thermostat is in a continuously closed circuit condition and does not cycle.

The method may also include mounting the heater in direct contact with the end turns of the windings so that no thermal insulation is located therebetween thereby enhancing heat transfer between the heater and the motor windings.

FIG. 8 illustrates the results of selecting the opening and closing temperatures such that the heater is continuously energized and the thermostat provides a closed circuit during periods when the motor windings are not energized and substantially all residual heat has dissipated from the motor, i.e., after time T.

In the embodiment illustrated in FIG. 6, the heater has a surface area and a power density such that the heat generated by the heater generally does not raise the temperature of the heater above the maximum temperature during periods when the motor windings are not energized and substantially all residual heat has dissipated from the motor, i.e., after time T. As a result, the heat generated by the heater does not cause the temperature of the motor to exceed the maximum temperature and the heat generated by the heater inhibits condensation on the windings during periods when the motor windings are not energized, i.e., after time T.

The maximum surface temperature of the heater, when mounted directly on the end turns, will be the sum of the ambient temperature, the winding temperature rise due to operation of the motor, and the heater temperature rise due to energization of the heater. If the sum of the ambient temperature and the winding temperature rise exceeds 140° C. (the maximum desired operating temperature), the thermostat will not allow the heater to operate, but the heater surface temperature will be equal to the total temperature of the winding, as shown in FIGS. 7 and 8.

In general, thermostat operation is transient depending upon heat output of the heater, thermal resistance between the heater and the thermostat and the relative rate of the cooling of the motor. Thus, the thermostat opening temperature, as illustrated in FIGS. 7 and 8 does not exactly correspond to the maximum temperature of the heater. Furthermore, FIGS. 5, 6 and 7 are based on assumed optimization of existing motors and heaters.

In view of the above, it will be seen that the several objects of the invention are achieved and other advantageous results attained.

As various changes could be made in the above without departing from the scope of the invention, it is intended that all matter contained in the above description and shown in the accompanying drawings shall be interpreted as illustrative and not in a limiting sense.

What is claimed is:

1. An apparatus adapted to be connected to a power source, the apparatus for driving a rotatable component, the apparatus comprising:

a motor having a stationary assembly and a rotatable assembly in magnetic coupling relation to the stationary assembly, the rotatable assembly in driving relation to the rotatable component, the stationary assembly including windings adapted to be energized by the power source to produce an electromagnetic field for rotating the rotatable assembly, the windings having a maximum desired operating temperature and a predetermined minimum desired temperature rise;

a heater having a heating element in a conductive heat exchange relationship to and on an outer surface of the windings, the heater adapted to be connected to the power source at least when the motor windings are not energized to generate heat transferred from the heating element to the windings to increase the temperature of the windings;

a thermostat for sensing an operating temperature of the heater and for sensing an operating temperature of the motor windings, said thermostat connected in series between the heater and the power source, the thermostat having an opening temperature and a closing temperature such that when the temperature of the thermostat is below the closing temperature, the thermostat is adapted to provide a closed circuit between the heater and the power source to energize the heater and such that when the temperature of the thermostat is above the opening temperature, the thermostat is adapted to provide an open circuit between the heater and the power source to inhibit energizing the heater;

wherein the opening temperature of the thermostat is less than the maximum desired operating temperature of the motor windings so that the thermostat presents an open circuit and the heater does not generate heat immediately after energization of the motor windings is discontinued when the motor has reached the maximum desired operating temperature; and wherein the closing temperature of the thermostat is greater than an ambient temperature of the motor so that the thermostat presents a closed circuit and the heater generates heat when the thermostat temperature is below the closing temperature whereby the thermostat limits a maximum temperature of the heater so that the generated heat is generally insufficient to cause overheating of the heater and the generated heat inhibits condensation on the windings during periods when the motor windings are not energized.

2. The apparatus of claim 1 wherein the thermostat is on the heater.

3. The apparatus of claim 1 wherein the windings include end turns and the heater is in direct contact with the end turns of the windings whereby no thermal insulation is located between the heater and the windings thereby enhancing heat transfer between the heater and the motor windings.

4. The apparatus of claim 1 wherein the heater comprises a flexible, strip heater.

5. The apparatus of claim 1 wherein the thermostat provides a closed circuit during periods when the motor windings are not energized so that the heater is energized during periods when the motor windings are not energized and substantially all residual heat has dissipated from the motor.

6. The apparatus of claim 1 wherein the heater is connected to the power source via the thermostat and wherein the heater is energized only during periods when the motor windings are not energized.

7. An apparatus adapted to be connected to a power source, the apparatus for driving a rotatable component, the apparatus comprising:

a motor having a stationary assembly and a rotatable assembly in magnetic coupling relation to the stationary assembly, the rotatable assembly in driving relation to the rotatable component, the stationary assembly including windings adapted to be energized by the power source to produce an electromagnetic field for rotating the rotatable assembly, the windings having a maximum desired operating temperature and a predetermined minimum desired temperature rise;

a heater having a heating element in a conductive heat exchange relationship to and on an outer surface of the windings, the heater adapted to be connected to the power source at least when the motor windings are not energized to generate heat transferred from the heating element to the windings to increase the temperature of the windings;

a thermostat on a surface of the heater and connected in series between the heater and the power source, the thermostat having an opening temperature and a closing temperature such that when the temperature of the thermostat is below the closing temperature, the thermostat is adapted to provide a closed circuit between the heater and the power source to energize the heater and such that when the temperature of the thermostat is above the opening temperature, the thermostat is adapted to provide an open circuit between the heater and the power source to inhibit energizing the heater;

wherein the opening temperature of the thermostat is less than the maximum desired operating temperature of the motor windings so that the thermostat presents an open circuit and the heater does not generate heat immediately after energization of the motor windings is discontinued when the motor has reached the maximum desired operating temperature; and wherein the closing temperature of the thermostat is at or above a sum of the predetermined minimum desired temperature rise of the windings plus an ambient temperature so that the thermostat presents a closed circuit and the heater generates heat when the thermostat temperature is below the closing temperature whereby the thermostat limits a maximum temperature of the heater so that the generated heat is generally insufficient to cause overheating of the heater and the motor windings, and the generated heat inhibits condensation on the windings during periods when the motor windings are not energized.

8. The apparatus of claim 7 wherein the heater has a surface area and a power density and wherein the surface area, the power density and the opening temperature of the thermostat are such that the heat generated by the heater generally does not raise the thermostat temperature above the opening temperature during periods when the motor windings are not energized and substantially all residual heat has dissipated from the motor thereby minimizing cycling of the thermostat during such periods.

9. The apparatus of claim 8 wherein the surface area, the power density and the opening temperature of the thermostat are such that the generated heat is generally insufficient to cause heating of the heater above the maximum desired operating temperature of the motor windings whereby the thermostat limits a maximum of temperature of the heater so that the generated heat is generally insufficient to cause overheating of the heater.

10. The apparatus of claim 9 wherein the windings include end turns and the heater is in direct contact with the end turns of the windings whereby no thermal insulation is located between the heater and the windings thereby enhancing heat transfer between the heater and the motor windings.

11. The apparatus of claim 7 wherein the heater has a surface area and a power density and wherein the surface area, the power density and the opening temperature of the thermostat are such that the generated heat is generally insufficient to cause heating of the heater above the maximum desired operating temperature of the motor windings whereby the thermostat limits a maximum temperature of the heater so that the generated heat is generally insufficient to cause overheating of the heater.

12. The apparatus of claim 7 wherein the opening temperature of the thermostat is less than the maximum desired operating temperature of the motor minus a motor temperature rise caused by the heater when continuously energized so that the thermostat presents an open circuit and the heater does not generate heat when the motor is at or near the maximum desired operating temperature whereby the thermostat prevents energization of the heater when the motor temperature is at or near the maximum desired operating temperature so that overheating of the motor and heater are prevented.

13. In an apparatus adapted to be connected to a power source, the apparatus for driving a rotatable component, the apparatus including a motor having a stationary assembly and a rotatable assembly in magnetic coupling relation to the stationary assembly, the rotatable assembly in driving relation to the rotatable component, the stationary assembly including windings adapted to be energized by the power source to produce an electromagnetic field for rotating the rotatable assembly, the windings having a maximum desired operating temperature and a predetermined minimum desired temperature rise, the improvement comprising:

a heater having a heating element in a conductive heat exchange relationship to and on an outer surface of the windings, the heater adapted to be connected to the power source at least when the motor windings are not energized to generate heat transferred from the heating elements to the windings to increase the temperature of the windings;

a thermostat for sensing an operating temperature of the heater and for sensing an operating temperature of the motor windings, said thermostat connected in series between the heater and the power source, the thermostat having an opening temperature and a closing temperature such that when the temperature of the thermostat is below the opening temperature, the thermostat is adapted to provide a closed circuit between the heater and the power source to energize the heater and such that when the temperature of the thermostat is above the opening temperature, the thermostat is adapted to provide an open circuit between the heater and the power source to inhibit energizing the heater;

wherein the opening temperature of the thermostat is less than the maximum desired operating temperature of the motor windings so that the thermostat presents an open circuit and the heater does not generate heat immediately after energization of the motor windings is discontinued when the motor has reached a maximum desired operating temperature; and wherein the opening temperature of the thermostat is greater than an ambient temperature of the motor so that the thermostat presents a closed circuit and the heater generates heat when the thermostat temperature is below the opening temperature whereby the thermostat limits a maximum temperature of the heater so that the generated heat is generally insufficient to cause overheating of the heater and the generated heat inhibits condensation on the windings during periods when the motor windings are not energized.

14. An apparatus adapted to be connected to a power source, the apparatus for driving a rotatable component, the apparatus comprising:

a motor having a stationary assembly and a rotatable assembly in magnetic coupling relation to the stationary assembly, the rotatable assembly in driving relation to the rotatable component, the stationary assembly including windings adapted to be energized by the power source to produce an electromagnetic field for rotating the rotatable assembly, the windings having a maximum desired operating temperature and a predetermined minimum desired temperature rise;

a heater having a heating element in a conductive heat exchange relationship to and on an outer surface of the windings, the heater adapted to be connected to the power source at least when the motor windings are not energized to generate heat transferred from the heating element to the windings to increase the temperature of the windings;

a thermostat for sensing an operating temperature of the heater and for sensing an operating temperature of the motor windings, said thermostat connected in series between the heater and the power source, the thermostat having an opening temperature and a closing temperature such that when the temperature of the thermostat is below the closing temperature, the thermostat is adapted to provide a closed circuit between the heater and the power source to energize the heater and such that when the temperature of the thermostat is above the opening temperature, the thermostat is adapted to provide an open circuit between the heater and the power source to inhibit energizing the heater; and wherein the closing temperature is such that the thermostat provides a closed circuit resulting in the heater being substantially continuously energized during periods when the motor windings are not energized and substantially all residual heat has dissipated from the motor to substantially maintain the temperature of the windings above a sum of the predetermined minimum desired temperature rise plus an ambient temperature; and wherein the closing temperature of the thermostat is greater than the ambient temperature of the motor so that the thermostat presents a closed circuit and the heater generates heat when the thermostat temperature is below the closing temperature whereby the heater generates heat which inhibits condensation on the windings during periods when the motor windings are not energized.

15. The apparatus of claim 14 wherein the opening temperature of the thermostat is less than the maximum desired operating temperature of the motor so that the thermostat presents an open circuit and the heater does not generate heat immediately after energization of the motor windings is discontinued when the motor has reached a desired operating temperature whereby the thermostat limits a maximum temperature of the heater so that the generated heat is generally insufficient to cause overheating of the heater.

16. The method of claim 15 wherein the winding include end turns and the heater is in direct contact with the end turns of the windings whereby no thermal insulation is located between the heater and the windings thereby enhancing heat transfer between the heater and the motor windings.

17. In an apparatus adapted to be connected to a power source, the apparatus for driving a rotatable component, the apparatus including a motor having a stationary assembly and a rotatable assembly in magnetic coupling relation to the stationary assembly, the rotatable assembly in driving relation to the rotatable component, the stationary assembly including windings adapted to be energized by the power source to produce an electromagnetic field for rotating the rotatable assembly, the windings having a maximum desired operating temperature and a predetermined minimum desired temperature rise, a control comprising:

a heater having a heating element in a conductive heat exchange relationship to and on an outer surface of the windings, the heater adapted to be connected to the power source at least when the motor windings are not energized to generate heat transferred from the element to the windings to increase the temperature of the windings;

a thermostat for sensing an operating temperature of the heater and for sensing an operating temperature of the motor windings, said thermostat connected in series between the heater and the power source, the thermostat having an opening temperature and a closing temperature such that when the temperature of the thermostat is below the closing temperature, the thermostat is adapted to provide a closed circuit between the heater and the power source to energize the heater and such that when the temperature of the thermostat is above the opening temperature, the thermostat is adapted to provide an open circuit between the heater and the power source to inhibit energizing the heater; and wherein the closing temperature is such that the thermostat provides a closed circuit resulting in the heater being substantially continuously energized during periods when the motor windings are not energized and substantially all residual heat has dissipated from the motor to substantially maintain the temperature of the windings above a sum of the predetermined minimum desired temperature rise plus an ambient temperature; and wherein the closing temperature of the thermostat is greater than the ambient temperature of the motor so that the thermostat presents a closed circuit and the heater generates heat when the thermostat temperature is below the closing temperature whereby the heater generates heat which inhibits condensation on the windings during periods when the motor windings are not energized.

18. The apparatus of claim 17 wherein the opening temperature of the thermostat is less than the maximum desired operating temperature of the motor so that the thermostat presents an open circuit and the heater does not generate heat immediately after energization of the motor windings is discontinued when the motor has reached a desired operating temperature whereby the thermostat limits a maximum temperature of the heater so that the generated heat is generally insufficient to cause overheating of the heater.

19. The method of claim 18 wherein the winding include end turns and the heater is in direct contact with the end turns of the windings whereby no thermal insulation is located between the heater and the windings thereby enhancing heat transfer between the heater and the motor windings.

20. An apparatus adapted to be connected to a power source, the apparatus for driving a rotatable component, the apparatus having a maximum temperature, said apparatus comprising:

a motor having a stationary assembly and a rotatable assembly in magnetic coupling relation to the stationary assembly, the rotatable assembly in driving relation to the rotatable component, the stationary assembly including windings having end turns and adapted to be energized by the power source to produce an electromagnetic field for rotating the rotatable assembly;

a heater in heat exchange relationship and in direct contact with the end turns of the windings, said heater adapted to be connected to the power source at least when the motor windings are not energized to generate heat transferred to the windings to increase the temperature of the windings;

wherein the heater has a surface area and a power density such that the heat generated by the heater generally does not raise the temperature of the heater above the maximum desired operating temperature during periods when the motor windings are not energized whereby no thermal insulation is located between the heater and the windings thereby enhancing heat transfer between the heater and the motor windings such that the heat generated by the heater does not cause the temperature of the motor or heater to exceed the maximum temperature and the heat generated by the heater inhibits condensation on the windings during periods when the motor windings are not energized wherein the power density is an order of 1.0 watts/in$^2$.

21. An apparatus adapted to be connected to a power source, the apparatus for driving a rotatable component, the apparatus comprising:

a motor having a stationary assembly and a rotatable assembly in magnetic coupling relation to the stationary assembly, the rotatable assembly in driving relation to the rotatable component, the stationary assembly including windings adapted to be energized by the power source to produce an electromagnetic field for rotating the rotatable assembly, the windings having a maximum desired operating temperature and a predetermined minimum desired temperature rise;

a heater in heat exchange relationship to an outer surface of the windings, the heater adapted to be connected to the power source at least when the motor windings are not energized to generate heat transferred to the windings to increase the temperature of the windings;

a thermostat connected in series between the heater and the power source, the thermostat having an opening temperature and a closing temperature such that when the temperature of the thermostat is below the closing temperature, the thermostat is adapted to provide a closed circuit between the heater and the power source to energize the heater and such that when the temperature of the thermostat is above the temperature, the thermostat is adapted to provide an open circuit between the heater and the power source to inhibit energizing the heater;

wherein the opening temperature of the thermostat is less than the maximum desired operating temperature of the motor windings so that the thermostat presents an open circuit and the heater does not generate heat immediately after energization of the motor windings is discontinued when the motor has reached the maximum desired operating temperature;

wherein the closing temperature of the thermostat is greater than an ambient temperature of the motor so that the thermostat presents a closed circuit and the heater generates heat when the thermostat temperature is below the closing temperature; and wherein the predetermined minimum desired temperature rise is equal to a temperature rise of the windings caused by continuous operation of the heater in a steady state condition after substantially all residual heat has been dissipated from the motor whereby the thermostat limits a maximum temperature of the heater so that the generated heat is generally insufficient to cause overheating of the heater and the heat generated inhibits condensation on the windings during periods when the motor windings are not energized.

* * * * *